United States Patent [19]
Shen et al.

[11] Patent Number: 6,118,767
[45] Date of Patent: Sep. 12, 2000

[54] INTERFERENCE CONTROL FOR CDMA NETWORKS USING A PLURALITY OF NARROW ANTENNA BEAMS AND AN ESTIMATION OF THE NUMBER OF USERS/REMOTE SIGNALS PRESENT

[75] Inventors: Donglin Shen, Bellevue; Martin J. Feuerstein, Redmond, both of Wash.

[73] Assignee: Metawave Communications Corporation, Redmond, Wash.

[21] Appl. No.: 08/974,592

[22] Filed: Nov. 19, 1997

[51] Int. Cl.[7] ............................. H04J 1/16; H04B 1/10; H04B 17/00
[52] U.S. Cl. ........................... 370/252; 455/522; 455/63
[58] Field of Search ............................... 370/320, 252, 370/328, 339, 342, 335; 455/522, 63, 501, 67.1, 67.3, 69, 115

[56] References Cited

U.S. PATENT DOCUMENTS

| | | | |
|---|---|---|---|
| 5,745,841 | 4/1998 | Reudink et al. | 455/62 |
| 5,771,461 | 6/1998 | Love et al. | 445/522 |
| 5,884,147 | 3/1999 | Reudink et al. | 455/67.1 |
| 5,887,262 | 3/1999 | Willhof | 455/452 |
| 5,889,494 | 3/1999 | Reudink et al. | 342/373 |

*Primary Examiner*—Douglas W. Olms
*Assistant Examiner*—David R Vincent
*Attorney, Agent, or Firm*—Fulbright & Jaworski L.L.P.

[57] ABSTRACT

Systems and methods for providing mitigation of interference in a CDMA cellular network caused by excessive in band energy are disclosed. In the preferred embodiment, multiple narrow antenna beams are used to isolate the excessive energy from that of signals from mobile units. Control circuitry measures the power level on each of these multiple beams, compares this measurement to an estimated number of mobiles operating in the associated antenna beam, and determines if excessive energy is present in the beam. If excessive energy is determined to exist, the present invention causes the gain of particular antenna beams to be adjusted so as to mitigate the effect of the excessive energy.

59 Claims, 3 Drawing Sheets

INTERFERENCE CONTROL FOR CDMA NETWORKS USING A PLURALITY OF NARROW ANTENNA BEAMS AND AN ESTIMATION OF THE NUMBER OF USERS/ REMOTE SIGNALS PRESENT

REFERENCE TO RELATED APPLICATIONS

Reference is hereby made to the following co-pending, commonly assigned, U.S. patent applications: Ser. No. 08/582,525, entitled "Method and Apparatus for Improved Control Over Cellular Systems"; Ser. No. 08/651,981, entitled "System and Method for Cellular Beam Spectrum Management"; Ser. No. 08/808,304, entitled "Conical Omni-Directional Coverage Multibeam Antenna with Multiple Feed Network"; Ser. No. 08/786,725, entitled "Antenna Deployment Sector Cell Shaping System and Method"; Ser. No. 08/924,285 entitled "Antenna Deployment Sector Cell Shaping System and Method"; Ser. No. 08/782,051, entitled "Pivotal Antenna System and Method"; and Ser. No. 08/892,946, entitled "System and Method for 911 Cellular Location Determination"; the disclosures of which are incorporated herein by reference.

TECHNICAL FIELD OF THE INVENTION

This invention relates in general to controlling interference in CDMA networks and more particularly to systems and methods for utilizing multiple antenna beams and circuitry for adjusting gain with respect to excessively high power received signals.

BACKGROUND OF THE INVENTION

Code division multiple access (CDMA) networks allow a number of communication signals to operate over the same frequency band simultaneously. Each communication unit is assigned a distinct, pseudo-random, chip code which identifies signals associated with the communication unit. The communication units use this chip code to pseudo-randomly spread their transmitted signal over the allotted frequency band. Accordingly, signals may be communicated from each such unit over the same frequency band and a receiver may despread a desired signal associated with a particular communication unit.

However, despreading of the desired communication unit's signal results in the receiver not only receiving the energy of this desired signal, but also a portion of the energies of other communication units operating over the same frequency band. Accordingly, CDMA networks are interference limited, i.e., the number of communication units using the same frequency band, while maintaining an acceptable signal quality, is determined by the total energy level within the frequency band at the receiver.

In order to provide reasonable capacity in the CDMA network, the mobile units are typically power controlled to reduce energy transmitted within the CDMA frequency band while maintaining sufficient power to provide an acceptable signal at a receiving unit. Through intelligent power control, the signals from all of the communication units may be adjusted to arrive at a receiver with substantially the same signal to interference ratio. As such, no one communication unit's signal will contribute excess energy to the total energy within the frequency band at the receiver.

Accordingly, in a cellular communication network, a base transceiver station (BTS), base station controller (BSC), or the like, may operate to control the power of mobile units such that each unit's signal, regardless of its location within a cell, is received at the BTS with the same signal to interference ratio. However, if a particular mobile, such as a rogue or malfunctioning mobile, is under power control but fails to operate in the required fashion, i.e., fails to respond properly to the power control commands sent to it, then it is likely that excess energy will be experienced at the BTS. Accordingly, this rogue mobile's signal will cause extra interference to other mobiles in the cell and, effectively, reduce the capacity of a particular cell or sector.

Moreover, as cellular CDMA networks typically utilize the same frequency band throughout neighboring cells, relying on different chip codes to identify particular mobiles assigned to each cell, the energy at any BTS is also affected by mobile units operating in neighboring cells. Therefore, a particular neighboring cell which is heavily loaded, i.e., providing communications for a large number of mobile units, may cause increased interference at the BTS. Similarly, a rogue mobile, as discussed above, even though operating in a neighboring cell may cause the above described interference at the BTS.

Additionally, it is also possible, in a CDMA network, for jamming interference or external interference to affect a particular cell or sector in such a way as to dramatically reduce the capacity. For example, any energy within the CDMA frequency band, whether sourced from in the network elements or externally, may increase the energy level at a particular BTS.

Accordingly, a need exists in the art for a system and method for mitigating the effects of undesired energy at a CDMA receiver site.

A further need exists in the art for the system and method mitigating the effects of undesired energy to not unnecessarily affect energy levels of desired signals within the frequency band.

SUMMARY OF THE INVENTION

These and other objects, features and technical advantages are achieved by a system and method which uses a multiple beam antenna system to isolate the effects of undesired received energy. Preferably, the multibeam antenna system provides substantially non-overlapping antenna beams disposed azimuthally to provide 360° coverage. Accordingly, in the preferred deployment, each antenna beam would provide one 30° segment of azimuth. Of course, other numbers of beams, or other azimuth angles may be utilized according to the present invention, if desired.

According to a preferred embodiment of the present invention, measurements are made of the receive power in each of the beams of the multibeam antenna. Based on these received power measurements, a determination is made with respect to the relative traffic loading on the various beams. Additionally, an estimate is made as to whether there is external interference or inordinate amount of interference present in particular beams at the cell site, or from particular directions with respect to the cell site.

Utilizing the above information, the present invention operates to mitigate interference by adjusting attributes of signals of the antenna beam(s) determined to contain external or inordinate interference. Accordingly, excess energy, and thus interference, caused by a particular mobile or emanating from a particular direction may be mitigated without unnecessarily affecting signals as received in other antenna beams. Therefore, in the preferred embodiment using multiple 30° beams, rather than losing an entire 360° omni cell or 120° sector to interference caused by excessive energy, coverage and capacity is affected in only one 30° increment.

Alternatively, the present invention may operate to mitigate interference by adjusting attributes of the antenna beam signals determined not to contain external or inordinate interference. Here, the excess energy, and thus interference, caused by a particular mobile or emanating from a particular direction may be compensated for by altering attributes of the antenna beams which do not include the undesired energy.

A preferred embodiment of the present invention utilizes a variable gain adjustment between the antenna and the cell site receiver for each antenna beam. Accordingly, the present invention operates to adjust the attenuation to reduce the interference received from particular beams that have extremely high receive power levels.

Therefore, if the interference is arriving at the cell site from a particular direction, such that it is predominant in one beam relative to the other beams at that cell site, the gain of the antenna beam that is receiving the interference is reduced. Similarly, the attenuation in line with that beam could be increased, such as where received amplification is not utilized, such that the detrimental impact of the interference from that beam is reduced with resect to the other beams at that cell cite. Conversely, the gain of antenna beams not receiving the interference could be increased to compensate for the increased interference on particular antenna beams.

Alternatively, or additionally, the present invention may utilize phase and/or amplitude adjustments of the individual beams to create an antenna pattern to reject interference. Likewise, the present invention may utilize variable beam-to-sector mapping, i.e., disconnect a particular beam or set of beams from a sector transmitter and/or receiver, in order to reject interference. Accordingly, the present invention operates to create a null in the antenna pattern that is steered to the direction of the interference source. Similarly, the present invention may operate to physically adjust antenna structure, such as to adjust antenna downtilt, azimuth, or beam width, to avoid or reduce interference from external sources.

Therefore, if the interference is arriving at the cell site from a particular direction, such that it is predominant in one beam relative to the other beams at that cell site, attributes with respect to that beam are adjusted, such as the gain of the antenna beam that is receiving the interference is reduced. Similarly, the attenuation in line with that beam could be increased, such as where received amplification is not utilized, such that the detrimental impact of the interference from that beam is reduced with resect to the other beams at that cell cite. Conversely, the gain of antenna beams not receiving the interference could be increased to compensate for the increased interference on particular antenna beams.

It shall be appreciated that, without this invention, in a typical prior art omni directional or sectorized cell site, where a rogue interfering mobile or an external interferer are present, the capacity and coverage range and signal quality for the entire omni pattern or an entire sector are degraded due to the interference. With this invention, the affect of the interference is reduced to one beam, or some subset the total number of beams, of the multi-beam system. Accordingly, a technical advantage of the present invention is mitigation of the effects of undesired energy at a CDMA receiver site.

Moreover, as signal attributes are adjusted with respect to only those beams in which the undesired energy appears, a further technical advantage is realized in mitigating the effects of undesired energy without degrading signals within the frequency band which appear in other antenna beams, or within areas other than where the undesired energy appears.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
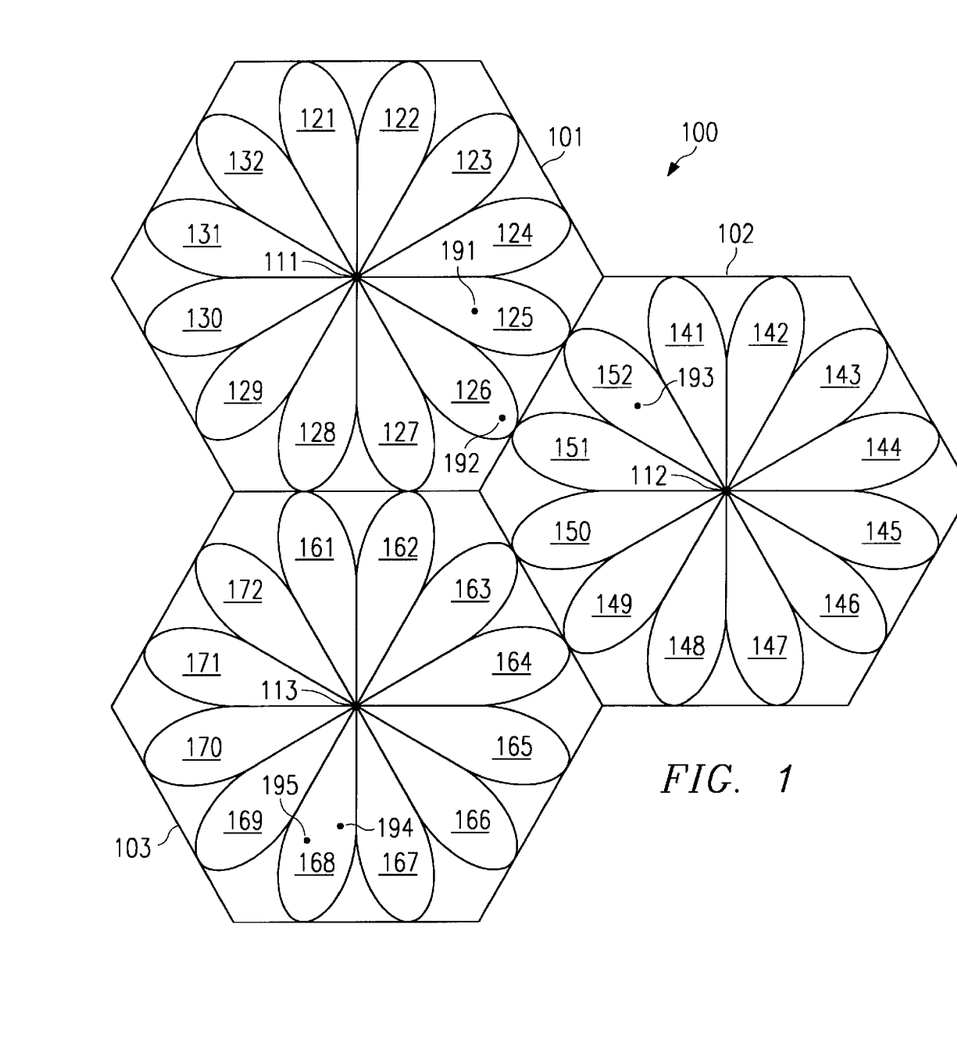
FIG. 1 illustrates a cellular network utilizing multiple narrow beams according to the present invention.

Directing attention to FIG. 1, a portion of deployed cellular network 100 is illustrated as including cells 101, 102 and 103. Associated with each cell is a base transceiver station (BTS) having a multibeam antenna; illustrated as BTS 111, 112 and 113 associated with cells 101, 102 and 103 respectively. In the preferred embodiment, the multibeam antenna of the BTSs provide 12 substantially non-overlapping narrow beams, illustrated as antenna beams 121–132, 141–152 and 161–172. Accordingly 360° coverage about each BTS is provided through the use of 12 approximately 30° beams. An antenna system adapted to provide multiple narrow beams suitable for use according to the present invention is disclosed in the above referenced U.S. patent application entitled "Conical Omni-Directional Coverage Multibeam Antenna with Multiple Feed Network."

It shall be appreciated, however, that the present invention is not limited to the use of 12 antenna beams and, in fact, may utilize any number of antenna beams deemed advantageous. Moreover, there is no requirement for the antenna beams utilized by the present invention to be substantially uniform as depicted in FIG. 1.

Also illustrated in FIG. 1 are mobile units 191–195 operating in cellular network 100. Although both operating in cell 101, mobile units 191 and 192 are shown operating in different antenna beams. Mobile unit 193 is operating within 102. Mobile units 194 and 195 are shown operating in the same antenna beam of cell 103.

Cellular network 100 utilizes code division multiple access (CDMA) to allow each of mobile units 191–195 to operate over the same frequency band simultaneously. Accordingly, each mobile unit is given a distinct, pseudo-random, chip code to distinguish its signals from those of the other mobile units. For example, a particular set of chip codes may be assigned to each of cells 101, 102 and 103 and, thus, mobile units operating therein are assigned a particular chip code from the set of chip codes. When a mobile unit crosses a boundary and is handed off to a neighboring cell, its chip code may be reassigned as a code selected from the new cell. Of course, the present invention may be used with schemes, other than the aforementioned CDMA, providing for the operation of multiple mobile units within a same frequency band.

The mobile units use the chip codes to pseudo-randomly spread their transmitted signal over the CDMA frequency band. Accordingly, signals may be communicated from each mobile unit over the same frequency band, regardless of which cell they are operating in, and a BTS demodulation receiver may despread signals of mobile units operating within the associated cell.

Generally, BTS radio equipment, such as the aforementioned demodulation receiver, is adapted to accept a small number of antenna beam signals. For example, it is not uncommon for a CDMA BTS to be adapted for communication as a single 360° omni site, i.e., a single antenna beam signal is accepted to provide communication throughout the entire cell. Likewise, a CDMA BTS may be adapted for communication as a 3 sectored system, i.e., 3 antenna beam signals, each providing 120° coverage, are accepted to provide 360° coverage.

However, CDMA cellular networks are interference limited, i.e., the number of mobile units which may use the CDMA frequency band, while maintaining an acceptable signal quality, is determined by the total energy level within the frequency band at the receiver. This is a limitation of spread spectrum CDMA systems because despreading of the desired mobile unit's signal results in the demodulation receiver not only receiving the energy of this desired CDMA signal, but also a portion of the total energy appearing within the CDMA frequency band.

Accordingly, all mobiles operating within the same omni cell or sector of a sectorized cell increase interference at the BTS with respect to the other mobiles. Likewise, any other energy in the CDMA frequency band received at the BTS, such as transmissions of mobiles operating in a neighboring cell, increase interference at the BTS with respect to all the mobiles operating therein.

Therefore, in order to provide reasonable capacity in the CDMA network, the mobile units are power controlled to reduce the energy transmitted within the CDMA frequency band to only that necessary to provide an acceptable signal at the appropriate BTS. Through intelligent power control, the signals from all of the communication units may be adjusted to arrive at a receiver with substantially the same signal to interference ratio.

For example, a BTS may transmit power control commands to mobile units operating within to corresponding cell, such as through a control channel, to cause the mobile units to adjust their transmission power to a particular level. Transmission of power control commands by the BTS may be a function of information monitored at the BTS such as signal to interference ratios of each of the mobile unit's despread signal. Where power control is operating ideally, each mobile unit's signal is adjusted so as to be at a minimum level to provide adequate communication with the BTS without contributing any excess or unnecessary energy to the total energy within the CDMA frequency band.

Referring again to FIG. 1, it can be seen that mobile unit 191 is operating nearer to BTS 111 than is mobile unit 192. Accordingly, assuming homogeneous communication characteristics throughout cell 101, if transmitting at the same power level, it can be expected that the power level of a signal from mobile unit 191 received at BTS 111, and thus the signal to interference ratio, would be greater than that of a signal from mobile unit 192. This result in itself is not necessarily bad. However, taking into consideration the fact that in a CDMA network the energy transmitted from mobile unit 191 is a portion of the interference experienced with respect to the signal from mobile unit 192, it is desirable to reduce the energy transmitted from mobile unit 191 to a point that reception is adequate at BTS 111, but there is little or no excess energy.

From the example illustrated in FIG. 1, it can be seen that a reduction in the power level of a signal transmitted from mobile unit 191, as compared to that of a signal from mobile unit 192, can result in the signals of the two mobile units being substantially equal when received at BTS 111. Likewise, an increase in the power level of a signal transmitted from mobile unit 192, as compared to that of a signal from mobile unit 191, can result in the signals of the two mobile units being substantially equal when received at BTS 111.

However, it shall be appreciated that BTS 111 controlling mobile units 191 and 192 so as to provide substantially equal signals at BTS 111 does nothing for the signals as received at neighboring BTSs. For example, because CDMA networks utilize the same frequency band across neighboring cells, adjusting the power level of mobile unit 192, located very near the junction of cells 101 and 102, will affect the interference level in cell 102. Accordingly, the communications of a mobile unit, such as mobile unit 193, operating within cell 102 will be affected. Similarly, where a mobile unit malfunctions or other wise does not respond to power control commands, other mobile units, whether in the same cell or a different cell than the malfunctioning unit, may experience increased interference.

Figure 2:
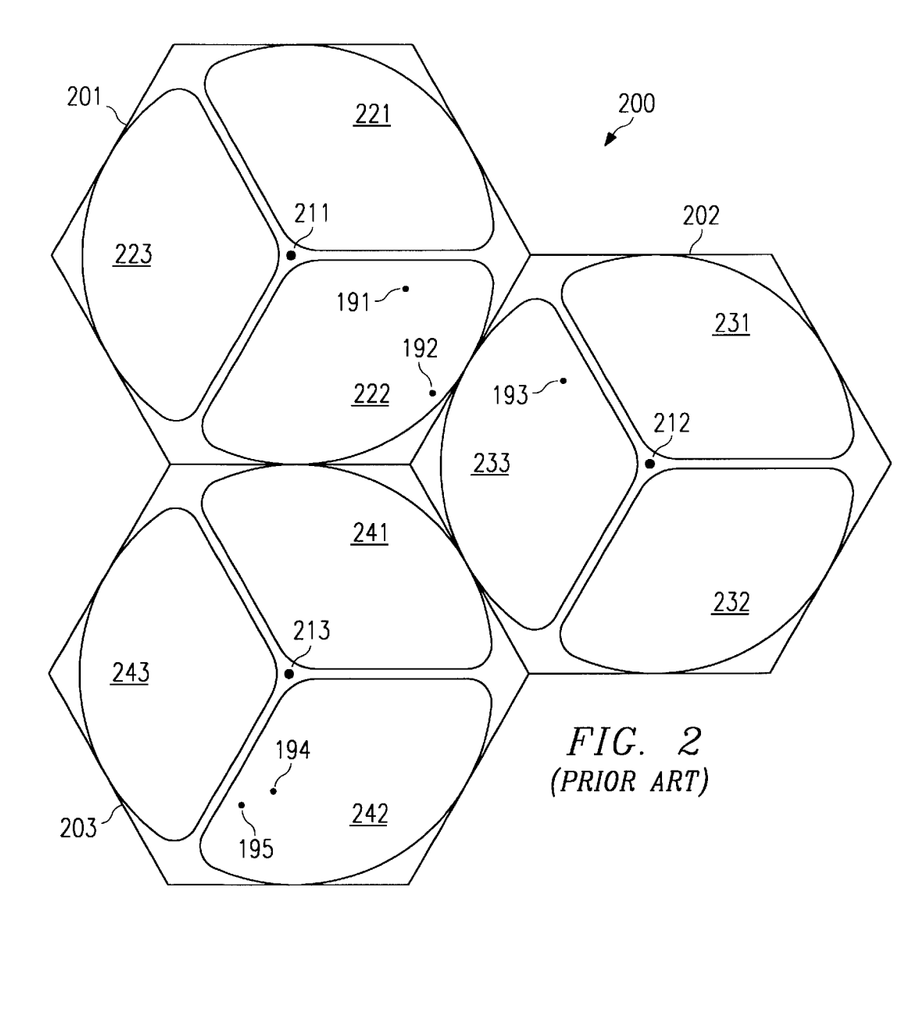
FIG. 2 illustrates a typical prior art sectorized cellular network.

Directing attention to FIG. 2, a typical prior art cellular network is shown as network 200 having cells 201, 202 and 203 with BTSs 211, 212 and 213 respectively. Here the cells are sectorized into three sectors each; cell 201 having sectors 221, 222, and 223, cell 202 having sectors 231, 232, and 233, and cell 203 having sectors 241, 242, and 243. Typically, the signals received in each sector at each of the BTSs are provided to sector inputs of a receiver. Accordingly, there is generally no provision for isolation of a particular mobile unit's signal from that of other mobile units operating in the same sector before demodulation the particular signal at the receiver. However, it shall be appreciated that, as discussed above, the demodulated mobile unit signal will include signal energy from other mobile units operating in the same sector, or other wise providing energy in the CDMA frequency band as received by the BTS as a sector signal.

Therefore, with reference to the above described examples of mobile unit operation, where mobile unit 193 increases the transmission power level in order to provide a signal to interference level equal to that of mobile unit 191 at BTS 211, because of its orientation, sector 233 of cell 202 is likely to receive increased energy associated with mobile unit 193. Accordingly, the signal of sector 233 as received at BTS 212 will include increased interference from mobile unit 193. This increased interference will adversely effect mobile unit 193 operating in sector 233 of BTS 212. Similarly, if mobile unit 191 were to malfunction, and thus fail to reduce its transmission signal power level, the energy in sector 222 will be unnecessarily high. This will result in increased interference and will adversely affect the signal to interference ratio at BTS 211 with respect to mobile unit 193 operating in sector 222.

Directing attention again to FIG. 1, it can be seen that through the use of narrow beams to provide substantially the same geographic coverage of the cells of cellular network 200, the mobile units may be operating within separate beams of the same cell. For example, mobile units 191 and 192 are operating within beams 125 and 126 respectively of cell 101, although geographically positioned substantially the same as in cell 201 where they are operating in the same sector, sector 222. Moreover, due to the narrow attribute of the beams of cellular network 100, it shall be appreciated that the signal of a particular mobile unit is more likely to be received, having useful attributes, on multiple ones of the antenna beams than are the signals of mobiles operating in the three sectored system. These distinctions are utilized advantageously by the present invention.

Figure 3:
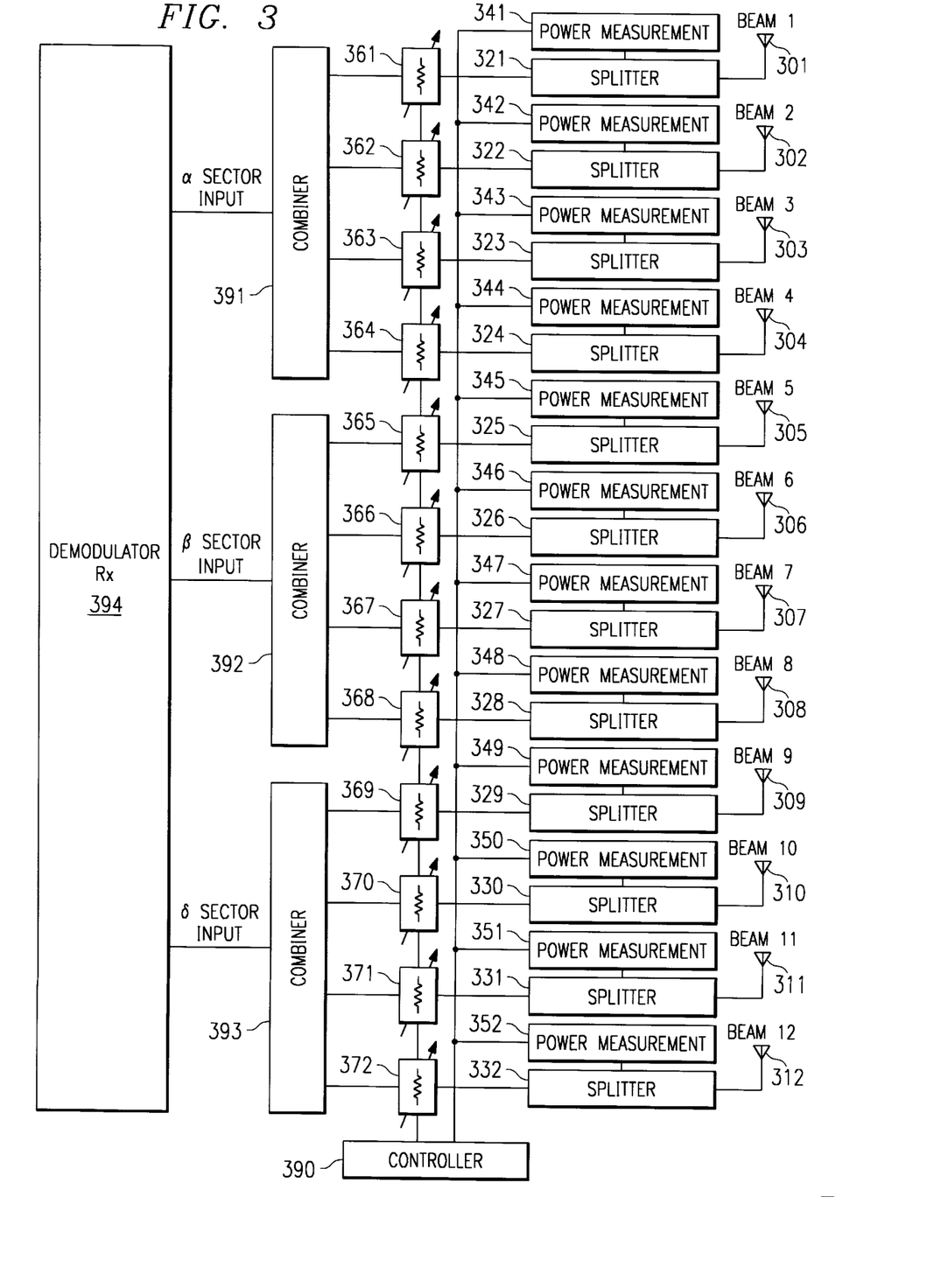
FIG. 3 illustrates a block diagram of circuitry providing mitigation of interference according to the present invention.

Directing attention to FIG. 3, a preferred embodiment of circuitry adapted to provide the features of the present invention is illustrated. Antennas 301–312 are shown associated with 12 antenna beams, such as those illustrated in each of cells 101, 102 and 103. Although individual antennas are illustrated, it shall be appreciated that the present invention may operate with any arrangement of antenna structure providing multiple antenna beam signals. Accordingly, a single multibeam antenna or a phased array providing multiple antenna beams, for example, may be utilized according to the present invention.

Antennas 301–312 provide signals associated with each of the antenna beams of the cell. Each antenna beam signal is preferably split, such as by splitters 321–332 associated with antennas 301–312 respectively, for provision to a measurement apparatus, such as power measurement circuitry 341–352.

The power measurement circuitry monitors attributes of each of the antenna beam signals, such as an in band power level of the CDMA frequency band. This information is preferably provided to a controller, such as controller 390. Of course, rather than providing discrete power measurement circuitry for each of the antenna beams, splitters 321–332 may provide the antenna beam signals to centralized measuring circuitry, such as might be included in controller 390, if desired.

Controller 390 is also coupled to variable attenuators 361–372 associated with antennas 301–312 respectively. Attenuators 361–372 are disposed in the signal path between the antennas and the BTS receiver, such as demodulation receiver 394. Accordingly, controller 390 may operate to adjust individual antenna beam signals, as discussed hereinbelow, as a function of monitored antenna beam signal attributes for provision to the BTS receiver. Although referred to as "attenuators," the devices indicated by reference numerals 361–372 may in fact be any form of variable gain devices, including any combination of attenuation and amplification functionality.

It shall be appreciated that the demodulation receiver illustrated in FIG. 3 provides for 3 sector inputs, i.e., is adapted to operate in a cellular network such as is illustrated in FIG. 2. However, combiners 391, 392 and 393 are provided to map the narrow antenna beams to these sector inputs. Accordingly, beams 1–4 of FIG. 3, such as might correspond with antenna beams 121–124 of FIG. 1, are provided to the α input, which might correspond with sector 221 of FIG. 2, of demodulation receiver 394. Likewise, beams 5–8 of FIG. 3, such as might correspond with antenna beams 125–128 of FIG. 1, are provided to the β input, which might correspond with sector 222 of FIG. 2, of demodulation receiver 394 and beams 9–12 of FIG. 3, such as might correspond with antenna beams 129–132 of FIG. 1, are provided to the Γ input, which might correspond with sector 223 of FIG. 2, of demodulation receiver 394.

It shall be appreciated that the fixed sector mapping illustrated in FIG. 3 is not a limitation of the present invention. For example, a system wherein the various narrow beams are dynamically mapped to sector inputs of a demodulation receiver may be used according to the present invention. Systems and methods for dynamically mapping antenna beams to sectors suitable for use with the present invention are disclosed in the above referenced U.S. patent applications entitled "Antenna Deployment Sector Cell Shaping System and Method." In addition to providing the advantages of dynamic adjustment of sector orientation and sizing, changes in beam-to-sector mapping may be used according to the present invention to reject interference. For example, a sector may be sized or oriented, including completely disconnecting a particular beam or set of beams from a sector transmitter and/or receiver, so as to exclude an area from which a jamming signal is originating. Similarly, the present invention may operate to adjust antenna structure, such as to adjust antenna downtilt, azimuth, or beam width, to avoid or reduce interference from external sources. In a preferred embodiment controller 390 is coupled to a control system providing automated control of antenna beam downtilt, such as taught in the above referenced patent application entitled "Pivotal Antenna System and Method."

Moreover, antenna beam sector mapping is not required in order to achieve advantages of the present invention. For example, a beam switching system, such as where a number of antenna beams having the most desirable attributes with respect to a particular mobile unit are switched to a particular input, may utilize the present invention. A system and method for providing beam switching for mobile units suitable for use with the present invention is disclosed in the above referenced U.S. patent application entitled "System and Method for Cellular Beam Spectrum Management." Furthermore, an omni cell site, providing 360° coverage without the use of sectorization, may utilize the present invention. However, for simplicity, the present invention will be discussed herein with reference to the antenna beam to sector mapping illustrated in FIG. 3.

As discussed above, where mobile unit 191 malfunctions, or other wise fails to respond to commands from BTS 111 to adjust the transmit power level, the communications of other mobile units operating in that sector will be affected. However, it shall be appreciated that, in the preferred embodiment of the present invention, mobile units 191 and 192 are operating within different antenna beams, antenna beams 125 and 126 respectively. Although the signals of these two antenna beams are ultimately provided to the same input of demodulation receiver 394, the present invention provides circuitry in each antenna beam's signal path such that the mobile unit's signals appearing in separate antenna beams may be individually manipulated. Accordingly, as a function of a high power measurement at power measurement circuit 345, controller 390 may control attenuator 365 to attenuate the signal of antenna beam 125 and, thus, mitigate the effect of the malfunctioning mobile unit with respect to mobile unit 192. It shall be appreciated that attenuation of the signal by attenuator 365 may include attenuation approaching infinity and, thus, effectively disconnecting the antenna beam signal from the receiver.

Similarly, as discussed above, where mobile unit 192 is commanded to increase transmission power in order to provide a signal at BTS 111 with a signal to interference substantially that of mobile unit 191, interference may be increased in a neighboring cell. However, in the network of FIG. 1, the energy of mobile unit 192 is most likely to be received in antenna beam 151 of cell 102, whereas mobile unit 193 is operating in antenna beam 152. Where the circuitry of FIG. 3 is utilized by BTS 112, the present invention operates to attenuate the signal of antenna beam 151 and, thus, mitigate the effect of mobile unit 192 with respect to mobile unit 193. As mentioned above, attenuation of the signal by the attenuator associated with antenna beam 151 may include attenuation approaching infinity and, thus, effectively disconnecting the antenna beam signal from the receiver. This may be particularly desirable where the particular antenna beam receiving the interfering signal is not servicing a mobile unit of the cell, such as is illustrated in FIG. 1.

Rather than attenuating the signal of the antenna beam receiving the signal determined to introduce excessive interference, as described above, the present invention may operate to amplify antenna beam signals which do not include the excessive interference to achieve substantially the same result as described above. Moreover, it shall be appreciated that the present invention may utilize a combination of attenuating antenna beam signals including the excessive interference and amplifying other antenna beam signals, in order to present signals to the demodulation receiver which, when demodulated, provide sufficient signal to interference or other desired attributes.

Additionally, or alternatively, in addition to providing the advantages of dynamic adjustment of sector orientation and sizing, changes in beam-to-sector mapping, such as describe above, may be used according to the present invention to reject interference. For example, a sector may be sized or oriented, including completely disconnecting a particular beam or set of beams from a sector transmitter and/or receiver, so as to exclude an area from which a jamming signal is originating.

Similarly, the present invention may operate to adjust antenna structure, such as to adjust antenna downtilt, azimuth, or beam width, to avoid or reduce interference from external sources. In a preferred embodiment controller 390 is coupled to a control system providing automated control of antenna beam downtilt, such as taught in the above referenced patent application entitled "Pivotal Antenna System and Method." Accordingly, a particular beam or beams may be tilted so as to avoid a particular source of interference such as a PCS service provider operating at 1.9 GHz might experience from a fixed microwave service provider sharing the spectrum. Of course, antenna beam downtilt may be accomplished electronically as is taught in the above referenced patent application entitled "Antenna Deployment Sector Cell Shaping System and Method."

It shall be appreciated that loading of cells may be such that multiple mobile units are operating within a same antenna beam, such as are mobile units 194 and 195. Accordingly, if a signal determined to be causing excessive interference, i.e., the signal of a malfunctioning or rogue mobile unit 195, the present invention's operation to mitigate the interference will also affect the signal of the other mobile, mobile unit 194, operating within that antenna beam. However, as the antenna beams used in the preferred embodiment are narrow, it is likely that this other mobile's signal will be present in another antenna beam of the cell, such as an adjacent antenna beam. For example, as mobile unit 194 is near the boundary of antenna beams 167 and 168, it is likely that its signal will appear in each of these antenna beams. The present invention's attenuation of the antenna beam signal including the excessive interference, antenna beam 168, will not affect the signal in this other beam, antenna beam 167.

Of course, the narrow beams of the preferred embodiment are also likely to include energy associated with the malfunctioning or rogue mobile unit in more than one antenna beam. For example, since mobile unit 195 is operating near the boundary of antenna beams 168 and 167, it is likely that its signal will appear in each of these antenna beams. However, it shall be appreciated that due to the physical location differences of the two mobile units, the two antenna beams associated with each unit's signal are different. Moreover, signal propagation differences other than simply physical location differences, such as multi-path conditions due to terrain, make it unlikely that both the rogue and the other mobile's signals will be received in the same proportions in the same antenna beams. Accordingly, the present invention may mitigate the effects of the malfunctioning mobile, even if other mobile units are operating in the same antenna beam, by attenuating only those beams including the excessive interference, here antenna beams 168 and 169, while utilizing other non-attenuated beams including the signals of the other mobiles, here antenna beam 167.

Moreover, as discussed above, amplification may be used in combination with the attenuation. Therefore, the other antenna beam signals including signals from those mobile units operating in the same beam as the malfunctioning unit may have the gain increased in order to provide a desirable signal to interference ratio, or other attribute, for those mobiles.

Alternatively, rather than rely on another antenna beam at the cell currently servicing both mobiles, it may be desirable to cause a handoff of the non-malfunctioning mobile unit to a adjacent cell. It is possible that the position of the non-malfunctioning mobile will be such that antenna beams at a neighboring cell are able to receive its signal with a better signal to interference ratio, or other desired attribute, than is the second antenna beam of the original cell. Accordingly, it may be advantageous to cause this mobile to operate under control of a neighboring cell. Systems and methods providing network wide control of cell sites suitable for use with the present invention are disclosed in the above referenced U.S. patent application entitled "Method and Apparatus for Improved Control Over Cellular Systems."

An alternative embodiment of the present invention utilizes phase and/or amplitude adjustments of the individual beams to create an antenna pattern to reject interference. Accordingly, phase adjusters (not shown) are disposed in the signal path between the antennas and the BTS receiver and are coupled to a controller, such as are the attenuators of FIG. 3. Utilizing these phase shifters, under control of controller 390, for example, the present invention operates to create a null in the antenna pattern that is steered to the direction of the interference source. By intelligent control of the phase shifters and/or attenuators of the various antenna beam signals, destructive combining of the antenna beam signals may be utilized advantageously to reject interfering signals. Accordingly, this embodiment of the present invention may operate substantially eliminate the effects of a particular signal source without completely disconnecting any antenna beam from a sector transmitter or receiver.

Having described the operation of the present invention to mitigate the effects of excess energy in the CDMA frequency band, a preferred embodiment of controller 390 to operate according to the present invention will be discussed. It shall be appreciated that controller 390 may be a processor based system adapted to receive input signals with respect to monitored conditions at an associated cell and signal outputs for controlling the attenuators of the present invention. Controller 390 preferably includes a central processing unit operating under control of an instruction set defining a protocol according to the present invention. Accordingly, controller 390 may be a general purpose computer system, including the aforementioned instruction set in the form of a computer program, adapted to include the above mentioned interfaces.

Figure 4:
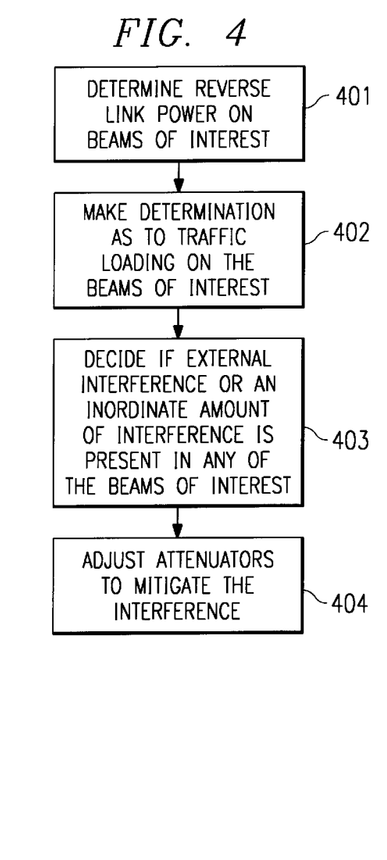
FIG. 4 illustrates a flow diagram of the controller of the present invention.

Directing attention to FIG. 4, a flow diagram of a preferred embodiment of the operation of controller 390 is shown. It shall be appreciated that the flow diagram of FIG. 4 may be performed by the above mentioned processor based system operating under control of an instruction set.

At box 401, a determination of the reverse link, or receive, power level on the beams of interest is made. It shall be appreciated that, although the present invention operates with respect to each of the beams of a cell, it may be advantageous to make control decisions based on particular subsets of those beams. For example, where beams are mapped to sectors, the beams associated with each sector may be considered together in mitigating interference in that sector. This may be advantageous as information utilized by the controller may be provided with respect to sector signals as received by the demodulation receiver. For example, a scan receiver (not shown) at the BTS, providing information to controller 390, may be adapted to scan channels, or codes, in sectors rather than the individual antenna beams. Accordingly, controller 390 may be provided information from the combined sector signal with respect to a number of mobile units being serviced in a sector, the interference level in a sector, signal to interference ratios of mobiles in the sector, or the like.

At box 402, a determination is made as to the traffic loading, i.e., the distribution of mobiles, on the beams of interest. This determination may be made as a function of the power level measurements from box 401 and information provided from the cell site controller, such as that described above with respect to the scan receiver. Accordingly, the number of mobile units on each beam may be estimated, for example, as a function of the power level measured on each beam associated with a sector and the number of mobile units operating in that sector. Additionally, or alternatively, geographic location information with respect to the mobiles may be used in the determination. Systems and methods for determining the geographic positions of mobile units suitable for use with the present invention are disclosed in the above referenced U.S. patent application entitled "System and Method for 911 Cellular Location Determination."

At box 403, a decision is made as to whether external interference or an inordinate amount of interference is present in any of the beams of interest, i.e., if a malfunctioning or rogue mobile is transmitting at an excessively high power level or if in band energy is being received in an antenna beam from some external source. This decision may be made utilizing the above determined traffic loading information. For example, estimating that a particular number of mobiles are operating in a particular beam, utilizing information with respect to the power levels expected from these mobiles at the BTS, a mathematical relationship may be utilized to determine that power in excess of the expected amount from these mobile units is present. Of course, as the power level adjustments of the mobile units are typically made in predefined increments, the mathematical relationship should provide tolerance for power levels of the mobiles within expected ranges associated with the incremental power level adjustments available. For example, a mean power level at the BTS may be determined which is used in calculating an expected antenna beam power level for the number of mobile units operating therein. If the actual measured power level is greater than some statistically relevant variance of this expected amount, i.e., a predetermined multiple of a standard deviation, the conclusion that interference is present in the antenna beam may be made.

Additionally, or alternatively, gauging external interference may be accomplished by comparing reverse link loading estimates, such as that made in step 402 from received power per beam, per sector, or per cell as determined at step 401, with forward link loading estimates, such as from transmitted power, transmitted signal-to-interference ratio, pilot channel measurements, demodulator/modulator utilization, resource allocation measures in the cell or network, back haul trunk utilization, or the like. Through comparison of the reverse link loading estimates with the forward link loading estimates, if the forward link or network level traffic estimates are lower than estimates based on reverse link received power for example, a determination as to the existence of external interference may be made.

Additionally, detection of reverse link interference may be accomplished according to an alternative embodiment of the present invention by using a narrow-band receiver to scan across the reverse link band, or portions thereof. The relative power measurements determined from scanning the reverse link may be utilized to indicate the presence of narrow-band jamming signals. Similarly, detection of reverse link interference may be accomplished by using a wideband receiver in combination with a bank of filters, or Fast Fourier Transform processing of the wideband signal, to detect the presence of narrow-band interference.

At box 404, the controller causes the variable attenuators to be adjusted to mitigate the interference. This is caused by the controller sending the proper control signals to selected ones of the attenuators associated with the proper antenna beams. As described above, mitigation may be accomplished by attenuating an antenna beam signal determined to include the interference. Additionally, or alternatively, mitigation may be accomplished by increasing the gain in an antenna beam signal determined not to include the interference. Of course, in the alternative embodiments where phase adjustment, sector orientation or shaping, antenna beam downtilt, or combinations thereof, are used, the controller causes the proper devices to be adjusted to mitigate the interference, as described above.

Although the present invention and its advantages have been described in detail, it should be understood that various changes, substitutions and alterations can be made herein without departing from the spirit and scope of the invention as defined by the appended claims.

What is claimed is:

1. A system for suppression of interference in a predefined frequency band as received on multiple narrow antenna beams, said system comprising:

means for determining whether excess energy within said predefined frequency band is present in at least one narrow antenna beam of said ones of said multiple narrow antenna beams, wherein said determination is a function of a measured received power and an estimation of a number of remote unit signals present; and means for adjusting an attribute of a selected antenna beam signal of at least one narrow antenna beam of said ones of said multiple narrow antenna beams, wherein said adjusted antenna beam signal is selected as a function of said at least one narrow antenna beam determined to include excess energy, and wherein said adjustment is selected to provide said suppression of interference.

2. The system of claim 1, wherein said estimation of a number of remote unit signals present is made as a function of a measured received power level of a particular narrow antenna beam of said multiple narrow antenna beams and information with respect to a total number of remote unit signals in said ones of said multiple narrow antenna beams.

3. The system of claim 2, wherein said information with respect to said total number of remote unit signals is provided from a base station apparatus external to said system.

4. The system of claim 1, wherein said determination of excess energy in said at least one narrow antenna beam includes a comparison of a measured received power level of said at least one narrow antenna beam to a preselected threshold power level.

5. The system of claim 4, wherein said threshold power level is preselected as a function of said estimated number of remote unit signals received and a power level statistically determined to represent the power level of a single remote unit signal.

6. The system of claim 1, wherein said determination of excess energy in said at least one narrow antenna beam includes a comparison of reverse link loading estimates with forward link loading estimates.

7. The system of claim 1, wherein said determination of excess energy in said at least one narrow antenna beam includes a comparison of a relative power measurement of a portion of said predefined frequency band with a relative power measurement of said predefined frequency band.

8. The system of claim 7, wherein said power measurement of said portion of said predefined frequency band is made utilizing a narrow-band receiver.

9. The system of claim 7, wherein said power measurement of said portion of said predefined frequency band is made utilizing Fast Fourier Transform processing.

10. The system of claim 1, wherein said attribute of a selected antenna beam signal adjusted by said adjusting means is an amplitude.

11. The system of claim 10, wherein said amplitude adjustment is a reduction in gain of an antenna beam signal of said at least one narrow antenna beam determined to include excess energy.

12. The system of claim 10, wherein said amplitude adjustment is attenuation of an antenna beam signal of said at least one narrow antenna beam determined to include excess energy.

13. The system of claim 10, wherein said amplitude adjustment is an increase in gain of an antenna beam signal of said at least one narrow antenna beam other than said at least one narrow antenna beam determined to include excess energy.

14. The system of claim 10, wherein said amplitude adjustment is a first change in amplitude of an antenna beam signal of said at least one narrow antenna beam determined to include excess energy and a second change in amplitude of an antenna beam signal of a narrow antenna beam other than said at least one narrow antenna beam determined to include excess energy, wherein said first and second changes are converse amplitude adjustments.

15. The system of claim 10, wherein said amplitude adjustment includes attenuation of an antenna beam signal associated with said at least one narrow antenna beams determined to include excess energy to effectively interrupt transmission of said antenna beam signal.

16. The system of claim 1, wherein said attribute of a selected antenna beam signal adjusted by said adjusting means is a phase.

17. The system of claim 1, where said ones of said multiple narrow antenna beams are a set of said multiple narrow antenna beams defining a cellular network cell.

18. The system of claim 1, wherein said ones of said multiple narrow antenna beams are a set of said narrow antenna beams defining a sector of a cellular network cell.

19. A method for mitigating interference in a CDMA communication network, said CDMA communication network having at least one base station utilizing a plurality of narrow antenna beams each providing an antenna beam signal, said CDMA communication network also having a plurality of remote units in communication with said base station, said method comprising the steps of:

determining the presence of interference in excess of a preselected threshold in at least one antenna beam signal of said ones of said antenna beam signals, wherein said determination is made as a function of a measured preselected attribute of said at least one antenna beam signal and an estimated number of remote unit signals in said at least one antenna beam signal; and adjusting an attribute of at least one antenna beam signal of said ones of said antenna beam signals, wherein said at least one antenna beam signal adjusted is selected as a function of said at least one antenna beam determined to include said excess interference.

20. The method of claim 19, wherein said estimation of a number of signals of said plurality of remote units present in a particular antenna beam signal is made as a function of said measured preselected attribute of said particular antenna beam signal and information with respect to a total number of remote unit signals in said ones of said antenna beam signals.

21. The method of claim 20, wherein said total number of remote unit signal information is provided from a base station apparatus selected from the group consisting of:

a scan receiver;

a base station controller; and a demodulation receiver.

22. The method of claim 19, wherein said determining step includes the step of:

comparing a reverse link loading estimate with a forward link loading estimate.

23. The method of claim 19, wherein said measured preselected attribute is a receive power level.

24. The method of claim 23, wherein said estimation of a number of signals of said plurality of remote units present in a particular antenna beam signal is made as a function of a total number of remote unit signals in said ones of said antenna beam signals scaled by a fraction of said receive power level of said particular antenna beam signal to a sum of said receive power level of each of said ones of said antenna beam signals.

25. The method of claim 23, wherein said determining step comprises the step of:

comparing a receive power measurement of a portion of said predefined frequency band with a receive power measurement of said predefined frequency band.

26. The method of claim 25, wherein said receive power measurement of said portion of said predefined frequency band is made utilizing a narrow-band receiver.

27. The method of claim 25, wherein said receive power measurement of said portion of said predefined frequency band is made utilizing Fast Fourier Transform processing.

28. The method of claim 23, wherein said preselected threshold is a preselected threshold power level.

29. The method of claim 28, wherein said threshold power level is preselected as a function of said estimated number of remote unit signals received and a power level representative of the power level of a remote unit signal.

30. The method of claim 19, wherein said attribute of said selected antenna beam signal adjusted by said adjusting means is an amplitude.

31. The method of claim 30, wherein said amplitude adjustment is a reduction in gain of said antenna beam signal determined to include excess interference.

32. The method of claim 30, wherein said amplitude adjustment is attenuation of said antenna beam signal determined to include excess interference.

33. The method of claim 30, wherein said amplitude adjustment is an increase in gain of an antenna beam signal other than said at least one antenna beam signal determined to include excess interference.

34. The method of claim 30, wherein said amplitude adjustment includes attenuation substantially interrupting transmission of said antenna beam signal determined to include excess interference.

35. The method of claim 19, wherein said attribute of at least one antenna beam signal of said ones of said antenna beam signals adjusted by said adjusting means is a phase.

36. The method of claim 19, wherein said ones of said antenna beam signals are associated to define a cell.

37. The method of claim 19, wherein said ones of said antenna beam signals are associated to define a sector of a cell.

38. A system for mitigating interference experienced at a receiver in a CDMA cellular network, said CDMA cellular network having at least one base station utilizing a plurality of narrow antenna beams each providing an antenna beam signal suitable for use by said receiver, said CDMA cellular network also having a plurality of mobile units in communication with said base station, said system comprising:

antenna beam signal attribute adjustment circuitry providing independent adjustment of a preselected attribute of ones of said antenna beam signals;

antenna beam signal measurement circuitry coupled to ones of said multiple narrow antenna beams accepting said ones of said antenna beam signals, said measurement circuitry providing a measurement signal output including information with respect to measurement of said ones of said antenna beam signals, wherein said measurement signal output is a function of a measured received power and an estimation of a number of remote unit signals present; and processor based controller circuitry coupled to said measurement circuitry accepting input of said measurement signal output, said controller circuitry also coupled to said adjustment circuitry and providing a control signal output thereto, wherein said controller circuitry provides at least one control signal output according to a predefined protocol to control said adjustment circuitry to adjust at least one selected antenna beam signal of said antenna beam signals as a function of said accepted measurement signal output.

39. The system of claim 38, wherein said measurement circuitry comprises:

a narrow-band receiver measuring receive power in a particular portion of a frequency band associated with said CDMA cellular network.

40. The system of claim 39, wherein said narrow-band receiver operates to scan various portions of said frequency band associated with said CDMA cellular network.

41. The system of claim 38, wherein said measurement circuitry comprises:

a wideband receiver coupled to circuitry detecting narrow-band interference.

42. The system of claim 41, wherein said narrow-band interference detection circuitry comprises a filter bank.

43. The system of claim 41, wherein said narrow-band interference detection circuitry comprises Fast Fourier Transform processing circuitry.

44. The system of claim 38, wherein said measurement circuitry comprises:

antenna beam traffic loading calculation circuitry providing a calculation of distribution of communication traffic associated with said plurality of mobile units on each of said ones of said antenna beam signals to said controller circuitry.

45. The system of claim 44, wherein said calculation of distribution of communication traffic includes a determination of forward link traffic and a determination of reverse link traffic, and wherein said protocol utilizes a comparison of said forward link and reverse link traffic determinations in adjusting said at least one selected antenna beam signal.

46. The system of claim 45, wherein said forward link traffic determination is made utilizing monitored information selected from the group consisting of:

a transmitted power;

a transmitted signal-to-interference ration;

a pilot channel measurement;

a demodulation utilization determination;

a modulation utilization determination;

a resource allocation determination; and a back haul trunk utilization.

47. The system of claim 44, wherein said protocol utilizes said calculation of distribution of communication traffic in providing said plurality of control signal outputs to selected ones of said antenna beam signals.

48. The system of claim 47, wherein said protocol comprises a set of instructions operable to compare said measurement signal output for each of said ones of said antenna beam signals with a corresponding said calculation of distribution of communication traffic of said ones of said antenna beam signals, wherein said control signal output is a function of said comparison.

49. The system of claim 44, wherein said calculation circuitry is also coupled to circuitry external to said system and is adapted to accept a signal from said external circuitry.

50. The system of claim 49, wherein said external circuitry signal includes information with respect to a number of said mobile units communicating on said ones of said antenna beam signals.

51. The system of claim 38, further comprising:

interference detection circuitry, wherein said measurement circuitry measures a forward link power level and a reverse link power level, and wherein said detection circuitry utilizes a comparison of said forward and reverse link power levels in determining the presence of interference.

52. The system of claim 38, further comprising: interference detection circuitry.

53. The system of claim 38, wherein said preselected attribute of said antenna beam signals adjusted is an amplitude.

54. The system of claim 53, wherein said adjustment circuitry includes a variable attenuator for each of said ones of said antenna beam signals.

55. The system of claim 53, wherein said adjustment circuitry includes a variable gain device for each of said ones of said antenna beam signals.

56. The system of claim 53, wherein said antenna beam signal attribute adjustment circuitry is also providing independent adjustment of a phase of ones of said antenna beam signals, and wherein said controller circuitry also provides a control signal output according to said predefined protocol to control a phase of an antenna beam signal.

57. The system of claim 38, wherein said measurement circuitry measures a power level of said ones of said antenna beam signals.

58. The system of claim 38, wherein said controller circuitry comprises a general purpose processor based system.

59. The system of claim 38, wherein said plurality of narrow antenna beams are 12 substantially 30° non-overlapping antenna beams disposed azimuthally about said base station.

* * * * *